(12) United States Patent
Lorey et al.

(10) Patent No.: US 10,427,566 B2
(45) Date of Patent: Oct. 1, 2019

(54) VEHICLE SEAT COMPRISING AN ADDITIONAL VOLUME FOR LEVELLING AND STABILIZATION

(71) Applicant: GRAMMER AG, Amberg (DE)

(72) Inventors: Konstantin Lorey, Schmidgaden (DE); Hubert Wittmann, Floss (DE); Konstantin Krivenkov, Amberg (DE)

(73) Assignee: GRAMMER AG, Amberg (DE)

( * ) Notice: Subject to any disclaimer, the term of this patent is extended or adjusted under 35 U.S.C. 154(b) by 33 days.

(21) Appl. No.: 15/787,177

(22) Filed: Oct. 18, 2017

(65) Prior Publication Data

US 2018/0111524 A1    Apr. 26, 2018

(30) Foreign Application Priority Data

Oct. 24, 2016 (DE) .......................... 10 2016 120 194

(51) Int. Cl.
*B60N 2/52*    (2006.01)
*B60N 2/50*    (2006.01)

(52) U.S. Cl.
CPC ............ *B60N 2/525* (2013.01); *B60N 2/501* (2013.01); *B60N 2/527* (2013.01); *B60N 2/502* (2013.01);
(Continued)

(58) Field of Classification Search
None
See application file for complete search history.

(56) References Cited

U.S. PATENT DOCUMENTS 9,802,520 B2 * 10/2017 Kolb ................... B60N 2/502
9,849,816 B2 * 12/2017 Kolb ................... B60N 2/52
(Continued)

FOREIGN PATENT DOCUMENTS

DE         10330198       2/2005
DE       102007056700     6/2009

OTHER PUBLICATIONS

Official Action with machine translation for German Patent Application No. 102016120194.4, dated May 23, 2019, 3 pages.
(Continued)

*Primary Examiner* — David E Allred
(74) *Attorney, Agent, or Firm* — Sheridan Ross P.C.

(57) ABSTRACT

A vehicle seat comprising a device for levelling the vehicle seat is provided. The vehicle seat including an upper seat element, which can be moved relative to a lower seat element by a first air spring and on which a mass can be arranged The lower and the upper seat element are arranged at a predetermined distance from one another, and the first air spring is fluidically connected to an additional volume of an additional volume module by a first fluid connection. The internal pressure of the first air spring is controllable by the additional volume module. The device comprises a limited auxiliary volume, which is fluidically coupled to the additional volume by means of a fluid conveying unit and a second fluid connection, it being possible, when the distance changes between said seat elements due to a shift in weight of the mass on the upper seat element, to change the internal pressure of the additional volume and, indirectly, of the first air spring by a fluid being conveyed between the auxiliary volume and the additional volume by means of the fluid conveying unit in order to compensate for the change in distance.

5 Claims, 3 Drawing Sheets

(52) U.S. Cl.
CPC .............. *B60N 2/505* (2013.01); *B60N 2/508* (2013.01); *B60N 2/522* (2013.01)

(56) References Cited

U.S. PATENT DOCUMENTS

| | | | |
|---|---|---|---|
| 2009/0125194 A1* | 5/2009 | Haller | B60N 2/501 701/48 |
| 2010/0181708 A1* | 7/2010 | Kolb | B60G 17/0416 267/113 |
| 2012/0153695 A1* | 6/2012 | Haller | B60N 2/06 297/329 |
| 2016/0236594 A1* | 8/2016 | Dry | B60N 2/206 |
| 2016/0236597 A1* | 8/2016 | Dry | B60N 2/525 |

OTHER PUBLICATIONS

Search Report for German Patent Application No. 102016120194.4, dated Jun. 2, 2017, 3 pages.
Official Action (English machine translation) for Chinese Patent Application No. 201710909987.2, dated Aug. 2, 2019, 4 pages.

* cited by examiner

VEHICLE SEAT COMPRISING AN ADDITIONAL VOLUME FOR LEVELLING AND STABILIZATION

CROSS-REFERENCE TO RELATED APPLICATIONS

This application claims the benefit of German Patent Application No. DE 10 2016 120 194.4 filed Oct. 24, 2016, the entire contents of which are incorporated herein by reference.

FIELD

The invention relates to a vehicle seat comprising a device for levelling the vehicle seat, the vehicle seat comprising an upper seat element, which can be moved relative to a lower seat element by a first air spring and on which a mass can be arranged, the lower and the upper seat element being arranged at a predetermined distance from one another, and the first air spring being fluidically connected to an additional volume of an additional volume module by a first fluid connection, and an internal pressure of the first air spring being controllable by the additional volume module.

BACKGROUND

Vehicle seats having a levelling function are known in the art. In order to manipulate the internal pressure of the first air spring, a specific amount of fluid needs to be transferred from the additional volume or the first air spring, or the internal pressure of the entire system consisting of the additional volume and the first air spring needs to be changed.

A compressor is therefore provided, by means of which the internal pressure in the additional volume and the first air spring can be changed.

The compressor is activated frequently enough for the predetermined distance between the lower and the upper seat element to be kept as constant as possible under all operating conditions. However, it is disadvantageous for a vehicle driver when the compressor is active for a prolonged period of time, since it is very loud and makes for unbearable background noise. It can also make sounds easier to miss, and, amongst other things, the loud background noise can lead to ear problems, headaches or the like.

SUMMARY

Therefore, an object of the present invention is to provide a vehicle seat comprising a levelling device that does not require a compressor during operation and is therefore correspondingly quiet to operate.

This object is achieved as per the features of claim 1. Advantageous embodiments of the invention can be found in the dependent claims.

The key concept of the invention is to provide a vehicle seat comprising a device for levelling the vehicle seat, the vehicle seat comprising an upper seat element, which can be moved relative to a lower seat element by a first air spring and on which a mass can be arranged, the lower and the upper seat element being arranged at a predetermined distance from one another, and the first air spring being fluidically connected to an additional volume of an additional volume module by a first fluid connection, and the internal pressure of the first air spring being controllable by the additional volume module, the device comprising a limited auxiliary volume, which is fluidically coupled to the additional volume by means of a fluid conveying unit and a second fluid connection, it being possible, when the distance between said seat elements changes due to a shift in weight on the upper seat element, to change the internal pressure of the additional volume and, indirectly, of the first air spring by a fluid being conveyed between the auxiliary volume and the additional volume by means of the fluid conveying unit in order to compensate for the change in distance.

The first air spring is preferably deformable. More preferably, the vehicle seat comprises a scissor-type frame, which is arranged between the lower seat element and the upper seat element and connects the lower seat element to the upper seat element.

The lower seat element is preferably connected to a vehicle body or is already part of the body.

In this respect, the term "mass" means any body that can be arranged on the upper seat element. A mass is preferably a vehicle driver sitting on the vehicle seat, in particular on the upper seat element. In this respect, the term "additional volume module" means a device that comprises at least one additional volume, in particular a limited additional volume. It is also conceivable for the additional volume module to comprise a shut-off valve so that the first air spring is fluidically disconnected from the additional volume. Furthermore, the additional volume module can comprise various sensors, for example for detecting leakages or the like.

The auxiliary volume of the vehicle seat according to the invention is a limited auxiliary volume; i.e. the auxiliary volume can have only a limited volume.

In this case, weight is shifted when the vehicle is traveling uphill or downhill, for example, the vehicle seat being correspondingly deflected from the horizontal. As a result of this deflection, when travelling uphill, for example, the mass on the vehicle seat moves further backwards due to a grade resistance that is greater than zero, changing the distance between the upper and the lower seat element. Levelling is required as a result. Due to a change in pressure of the first air spring as a result of a specific amount of fluid being transferred from the auxiliary volume and the additional volume, along with a change in the internal pressure of the auxiliary volume, of the additional volume and of the first air spring, the internal pressure of the first air spring can be adapted so as to correspondingly compensate for the change in distance.

According to a particularly preferred embodiment, the device comprises a detection unit, by means of which the change in distance can be detected, and the internal pressure of the first air spring can be controlled by the fluid conveying unit by means of a control unit so as to compensate for the change in distance.

The detection unit preferably comprises a distance sensor, by means of which the distance between the upper seat element and the lower seat element can be detected and determined. Furthermore, the fluid conveying unit is actuated by means of the control unit in order to compensate for the change in distance. This type of control is provided as follows: depending on the change in distance, the control unit calculates the amount of fluid or the internal pressure of the first fluid spring that is needed to re-establish the predetermined distance. Accordingly, in the present case the fluid conveying unit is actuated by the control unit in order to produce the necessary internal pressure in the first air spring.

According to another embodiment, at least one damping unit for damping vibrational movements of the upper seat element relative to the lower seat element is provided between the lower and the upper seat element.

According to a particularly preferred embodiment, the device comprises a compressor unit which, when the upper seat element is covered by the mass, is used to fill the additional volume, optionally the auxiliary volume and the first air spring, with fluid up to a specific pressure, thereby specifying the distance.

If a person thus sits down on the vehicle seat, he would naturally want to set the seat height to a height that is deemed convenient and comfortable by that particular person. In order to achieve the appropriate seat height, the first air spring has to be filled with a certain amount of fluid so that the upper seat element is raised to the desired seat height. The first air spring is indirectly filled with fluid via the additional volume or the additional volume module by means of the compressor in this case, a pressure equilibrium in particular being set in the first air spring and the additional volume.

If the upper seat element is covered by the mass, and the distance is set by means of the compressor, the compressor is deactivated and is generally no longer needed during operation. Re-activation of the compressor is only necessary in the event of a leak or the like, or if another seat height is to be set.

According to a preferred embodiment, it is also conceivable for the additional volume and the auxiliary volume to be fluidically connectable by at least one bypass line that bypasses the second fluid connection and comprises an electrical and/or magnetic first valve, the first valve being open whilst the additional volume and the first air spring are being filled with fluid by means of the compressor unit.

This means that, when the additional volume and the first air spring are filled, the auxiliary volume is also indirectly filled, a pressure equilibrium in particular being set in the first air spring, in the additional volume and in the auxiliary volume.

According to a first preferred embodiment, the fluid conveying unit is designed as at least one vane pump or rotary vane pump. In particular, said pump is arranged between the additional volume module, in particular the additional volume, and the auxiliary volume, an electrical and/or magnetic second valve that is open as the internal pressure of the additional volume and of the first air spring is changed being arranged between the additional volume module, in particular the additional volume, and the fluid conveying unit.

A vane pump or a rotary vane pump that can be connected to the auxiliary volume is advantageous over a compressor or a compressor unit in that, during operation, the vane pump is considerably quieter to operate than the compressor that is otherwise provided, since the air is not conveyed from the environment, but rather from the auxiliary volume, which is already at the same pressure level as the additional volume and the air spring. The noise level is therefore kept low.

In particular, the second valve provided is open only when an internal pressure of the additional volume and of the first air spring is changed due to the change in the distance, thus making it possible to prevent a flow of fluid between the additional volume and the auxiliary volume. More preferably, the fluid conveying unit is activated only when the internal pressure of the additional volume and of the first air spring is changed, thus making it possible to reduce the noise level even further.

According to a preferred second embodiment, the additional volume is designed as a deformable second air spring, and the auxiliary volume that is closed or open with respect to the environment is designed as a deformable third air spring, a deformation apparatus being connected to the second and third air spring, and it being possible to change the internal pressure of the second and third air spring by deforming the second or the third air spring by means of the deformation apparatus in order to change the pressure of the first air spring.

For example, the second and third air springs are formed as a bellows, an air spring having a flexible skin, or the like.

The deformation apparatus preferably comprises a motor, in particular an electric motor comprising a rocker-like deformation element that deforms the second or the third air spring, depending on the direction of rotation of the motor. Deformation occurs in particular as a result of the deformation element pressing on the respective air spring, thereby changing the shape of the air spring and correspondingly changing the internal pressure of the air spring in order to indirectly change the internal pressure of the first air spring as a result.

In this case, an alternative embodiment is also conceivable, which can be used to solve the problem addressed.

A vehicle seat comprising a device for levelling and stabilising the vehicle seat, the vehicle seat comprising an upper seat element, which can be moved relative to a lower seat element by means of a first air spring and on which a mass can be arranged, the lower and the upper seat element being arranged at a predefined distance from one another, and the first air spring being fluidically connected to an additional volume of an additional volume module by a first fluid connection, and the internal pressure of the first air spring being controllable by the additional volume module, the additional volume being designed as a deformable air spring that is by means of a deformation apparatus that is connected to the deformable air spring, and the internal pressure of the deformable air spring can be changed by deforming the deformable air spring by means of the deformation apparatus in order to change the pressure of the first air spring so that, when the distance between said seat elements changes due to a shift in weight on the upper seat element, the internal pressure of the additional volume and, indirectly, of the first air spring can be changed in order to compensate for the change in distance.

The deformation apparatus particularly preferably comprises a motor, preferably an electric motor, which is used to operate the deformation apparatus. More preferably, the motor is designed so as to be able to deform the deformable air spring.

According to a preferred third embodiment, the additional volume is designed as a bubble store unit comprising a storage bubble, and the auxiliary volume comprises a liquid, it being possible for the liquid to be transferred between the bubble store unit, in particular the storage bubble, and the auxiliary volume by means of the fluid conveying unit that comprises a liquid pump.

By increasing or decreasing the amount of liquid in the bubble store unit, by compressing a gas that is also present in the bubble store unit, the internal pressure in the bubble store unit is correspondingly changed, and the internal pressure of the first air spring is accordingly indirectly changed as a result.

Particular preferably, the liquid is a highly viscous liquid. In particular, the liquid pump is a pump that is both suitable for and designed to convey highly viscous liquids.

Furthermore, the problem addressed is also solved by a method for levelling a vehicle seat, the vehicle seat comprising an upper seat element that can be moved relative to a lower seat element by means of a first air spring, the first air spring being fluidically connected to an additional volume of an additional volume module and being fluidically controllable by the additional volume module, and it being possible to connect an auxiliary volume to the additional volume, the method comprising the steps of:

a) covering the upper seat element with a mass;
b) setting a distance between the lower and the upper seat element by filling the additional volume and, indirectly, the first air spring with a necessary amount of fluid by means of a compressor, and deactivating the compressor after the filling process;
c) detecting a change in the distance as a result of a shift in weight; and
d) changing the pressure inside the additional volume and the first air spring by conveying the fluid between the additional volume and the auxiliary volume in order to counteract the change in distance.

"Covering the upper seat element with the mass" can mean a person sitting on the upper seat element of the vehicle seat, for example. If the upper seat element is covered by the mass, for example by just the person, the person can set the desired seat height of the vehicle seat using an adjustment device, creating a specific distance between the lower and the upper seat element. The additional volume and thus indirectly the first air spring are accordingly filled by means of the compressor with a necessary amount of fluid until an internal pressure required in the first air spring has been reached. The compressor is deactivated after the filling process.

If a change in the distance caused by a shift in weight of the mass is then detected, the internal pressure of the first air spring needs to be changed and adapted to the change in distance in order to counteract the change in distance. In order not to have to use the compressor, fluid is conveyed here between the additional volume and the auxiliary volume by means of the fluid conveying unit in accordance with the change in distance.

In general, it should be pointed out here that the change in distance is a slow change in comparison with a vibrational movement caused by external force impacts. The distance is therefore changed over an extended period of time. Furthermore, the extent to which the distance between said seat elements changes is also considerably smaller than the size of a force impact. The distance accordingly changes considerably slower than the change in distance caused by an external force impact. This is slow, automatic level stabilisation.

It is also conceivable for the device to be rapidly actuated in order to counteract the force impacts occurring. This is rapid level stabilisation.

Alternatively, the distance can also be changed manually by means of the device and not by operating a compressor. This is manual levelling.

Additional advantageous embodiments arise from the dependent claims.

BRIEF DESCRIPTION OF THE DRAWINGS

Additional aims, advantages and expedient uses of the present invention can be found in the following description in conjunction with the drawings, in which.

In the drawings, identical components can be seen with corresponding reference numerals in each case. For the sake of clarity, in some of the drawings, components that have been identified elsewhere may not be provided with a reference numeral.

DETAILED DESCRIPTION

Figure 1:
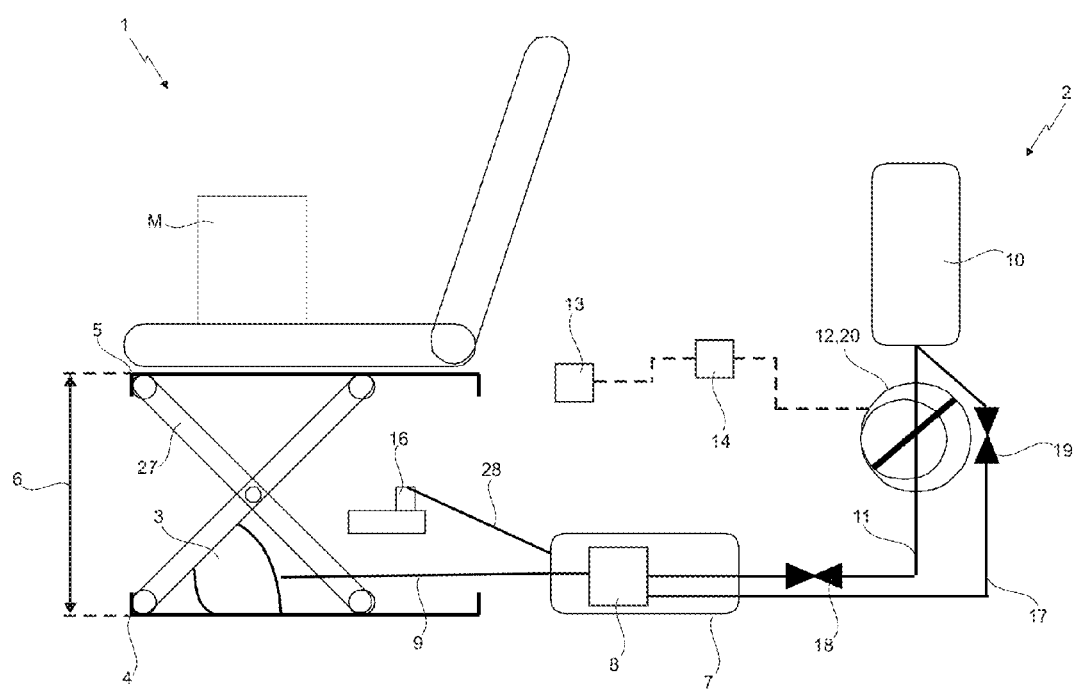
FIG. 1 shows a first preferred embodiment.

FIG. 1 shows a first preferred embodiment of the present invention. In this drawing, the fluid conveying unit 12 is designed as a vane pump 20 arranged between the additional volume 8 of the additional volume module 7 and the auxiliary volume 10. Furthermore, a first valve 18 that is designed in particular as a solenoid valve 18 is arranged between the additional volume module 7 and the vane pump 12, 20.

In this drawing, a mass M, which may be a person, for example, is arranged on the upper seat element 5. A distance 6 is set between the upper seat element 5 and the lower seat element 4, which is accompanied by a specific internal pressure of the first air spring 3 that is arranged between the lower seat element 4 and the upper seat element 5. In this case, the lower seat element 4 and the upper seat element 5 are interconnected by means of a scissor-type frame 27.

In this case, the distance 6 is set using a compressor unit 16, which is fluidically connected to the additional volume module 7 and in particular to the additional volume 8 by means of a third fluid connection 28. The additional volume 8 is filled with fluid by means of the compressor unit 16, and the first air spring 3 is indirectly filled with fluid by the first fluid connection 9 in order to produce a particular internal pressure in the first air spring 3.

In this case, the first valve 18 is provided to shut off/disconnect the fluid conveying unit 12 from the circuit. The valve 18 is open when the fluid conveying unit 12 is in operation and transferring air.

Furthermore, a bypass line 17 that bypasses the second fluid line 11 can be seen between the additional volume 8 and the auxiliary volume 10, the bypass line 17 comprising a second valve 19 that is formed in particular as a solenoid valve 19.

In this case, the second valve 19 is open when the additional volume and the first air spring 3 are filled by means of the compressor unit 16, so that the auxiliary volume 10 is additionally also filled with fluid. In this case, "filling with fluid" can be understood as both positive and negative filling. Negative filling means that an amount of fluid is removed from the device 2.

During operation of the vehicle seat 1 comprising the device 2 with a mass M, i.e. after setting the distance 6, the compressor unit 16 is deactivated. If a change in the distance 6 is detected by means of a detection unit 13, the fluid conveying unit 12 is actuated by means of a control unit 14 to change the internal pressure of the additional volume 8 and of the first air spring 3 by transferring fluid between the additional volume 8 and the auxiliary volume 10.

It is preferably also conceivable for the detection unit 13 and the control unit 14 to be parts of the additional volume module 7.

Figure 2:
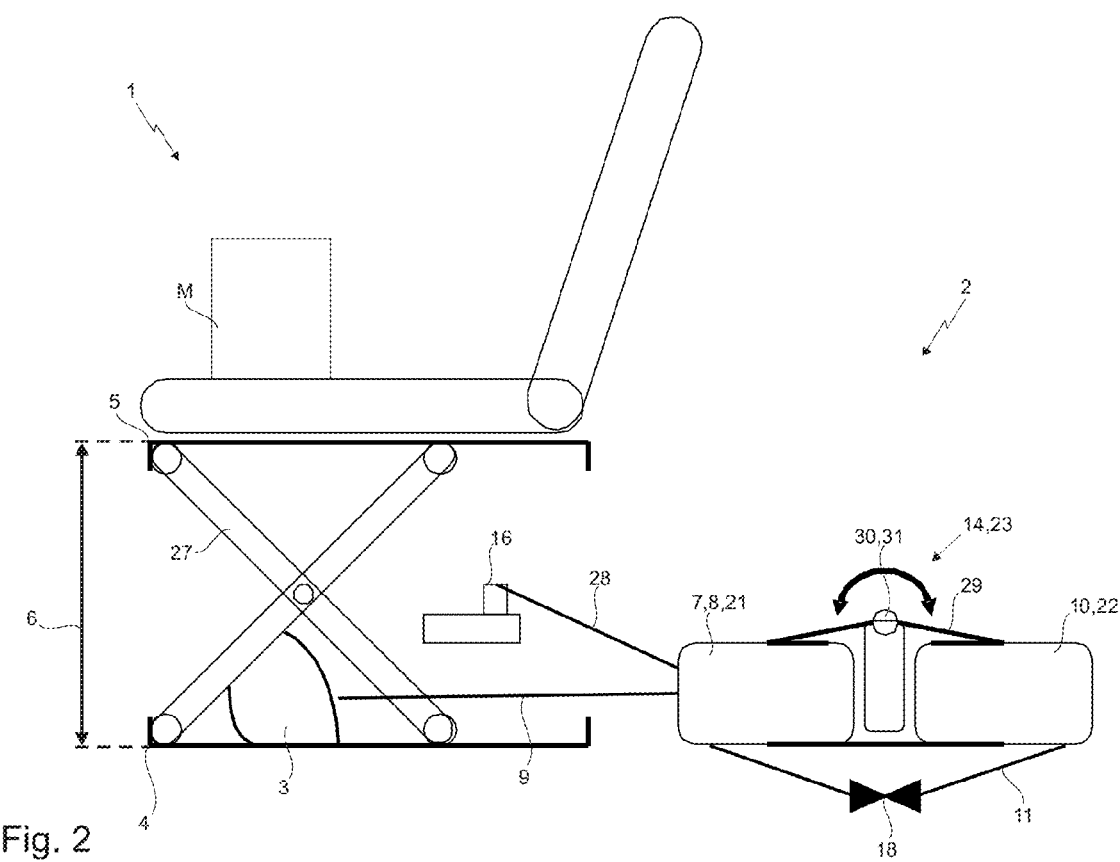
FIG. 2 shows a second preferred embodiment.

A vehicle seat 1 as already described in FIG. 1 can be seen in FIG. 2. In the present case, the device 2 is, however, different from the device 2 in FIG. 1. According to FIG. 2, the device 2 comprises the additional volume 8 in the form of a second air spring 21 and the auxiliary volume 10 in the form of a third air spring 22, both of which are in particular deformable.

In this case, the second 21 and the third 22 air springs are in turn interconnected by means of the second fluid connection 11, the second fluid connection 11 comprising the first valve 18. In this case, the second fluid connection 11 also fulfils the function of the bypass line 17, as shown in FIG. 1, and the first valve 18 fulfils the function of the second valve 19, as shown in FIG. 1.

In this case, the fluid conveying unit 12 is designed as a deformation apparatus 23 for deforming the second 21 or the third 22 air spring. The deformation apparatus 23 here comprises a rocker-like deformation element 29, which is connected to a motor 31 so as to be able to rotate about an axis of rotation 30. The second air spring 21 and the third air spring 22 are deformed according to the direction of rotation of the motor 31.

Figure 3:
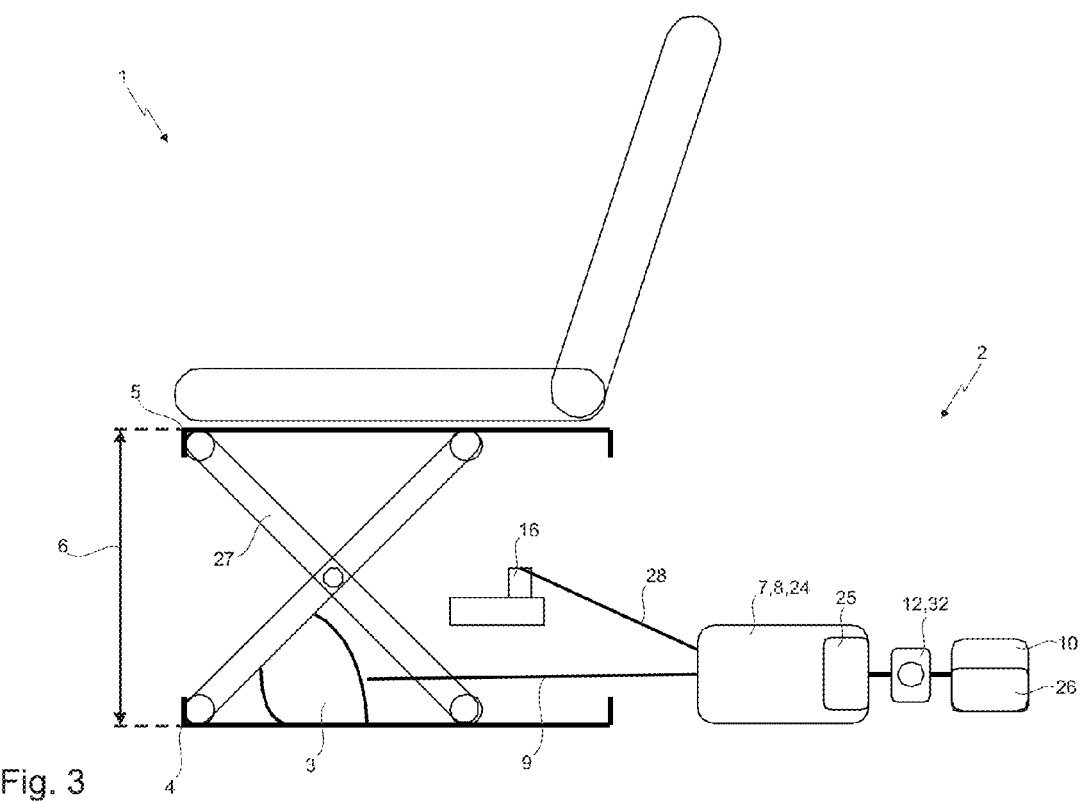
FIG. 3 shows a third preferred embodiment.

A vehicle seat 1 as already described in FIG. 1 or 2 can be seen in FIG. 3. However, in the present case, the device 2 is different from the device 2 in FIG. 1. In this case, the device 2 comprises a bubble store unit 24 having a storage bubble 25 as additional volume 8, it being possible for a liquid 26 to be arranged in the storage bubble 25.

The auxiliary volume 10 is designed as a liquid store, in which the liquid 26 can also be arranged. In this case, the additional volume 8, 24 and the auxiliary volume 10 are fluidically connected by means of a fluid conveying unit 12 in order to convey the liquid 26 between the storage bubble 25 and the auxiliary volume 10. In this case, however, only the first air spring 3 and the additional volume 8 are filled by the compressor unit 16.

All of the features disclosed in the application documents are claimed to be essential to the invention, provided they are novel, either in isolation or in combination, over the prior art.

LIST OF REFERENCE NUMERALS 1 vehicle seat
2 device for levelling
3 first air spring
4 lower seat element
5 upper seat element
6 distance
7 additional volume module
8 additional volume
9 first fluid connection
10 auxiliary volume
11 second fluid connection
12 fluid conveying unit
13 detection unit
14 control unit
16 compressor unit
17 bypass line
18 first valve
19 second valve
20 vane pump
21 second air spring
22 third air spring
23 deformation apparatus
24 bubble store unit
25 storage bubble
26 liquid
27 scissor-action frame
28 third fluid connection
29 deformation element
30 axis of rotation
31 motor
32 oil pump

What is claimed is:

1. A vehicle seat comprising a device for levelling and stabilising the vehicle seat, the vehicle seat comprising an upper seat element, which can be moved relative to a lower seat element by a first air spring and on which a mass can be arranged, the lower and the upper seat element being arranged at a predetermined distance from one another, and the first air spring being fluidically connected to an additional volume of an additional volume module by a first fluid connection, and the internal pressure of the first air spring being controllable by the additional volume module,
wherein the device comprises a limited auxiliary volume, which is fluidically coupled to the additional volume by means of a fluid conveying unit and a second fluid connection, it being possible, when the distance between said seat elements changes due to a shift in weight on the upper seat element, to change the internal pressure of the additional volume and, indirectly, of the first air spring by a fluid being conveyed between the auxiliary volume and the additional volume by means of the fluid conveying unit in order to compensate for the change in distance.

2. The vehicle seat according to claim 1, wherein the device comprises a detection unit, by means of which the change in distance can be detected, and the internal pressure of the first air spring can be controlled by the fluid conveying unit by means of a control unit so as to compensate for the change in distance.

3. The vehicle seat according to claim 1, wherein the device comprises a compressor unit which, when the upper seat element is covered by the mass, is used to fill the additional volume module and the first air spring with fluid up to a specific pressure, thereby specifying the distance.

4. The vehicle seat according to claim 1, wherein the additional volume is designed as a deformable second air spring, and the auxiliary volume is designed as a deformable third air spring, a deformation apparatus being connected to the second and third air spring, and it being possible to change the internal pressure of the second and third air spring by deforming the second or the third air spring by means of the deformation apparatus in order to change the pressure of the first air spring.

5. A vehicle seat comprising a device for levelling and stabilising the vehicle seat, the vehicle seat comprising an upper seat element, which can be moved relative to a lower seat element by a first air spring and on which a mass can be arranged, the lower and the upper seat element being arranged at a predetermined distance from one another, and the first air spring being fluidically connected to an additional volume of an additional volume module by a first fluid connection, and the internal pressure of the first air spring being controllable by the additional volume module,
wherein the additional volume is designed as a deformable air spring that can be changed by means of a deformation apparatus that is connected to the deformable air spring, and the internal pressure of the deformable air spring can be changed by deforming the deformable air spring by means of the deformation apparatus in order to change the pressure of the first air spring so that, when the distance between said seat elements changes due to a shift in weight on the upper seat element, the internal pressure of the additional volume and, indirectly, of the first air spring can be changed in order to compensate for the change in distance.

* * * * *